US005083144A

United States Patent [19]

Altmann

[11] Patent Number: 5,083,144

[45] Date of Patent: Jan. 21, 1992

[54] ELECTROPHOTOGRAPHIC WITH SCANNING PROCESS MODULE

[75] Inventor: Conrad Altmann, Rochester, N.Y.

[73] Assignee: Eastman Kodak Company, Rochester, N.Y.

[21] Appl. No.: 636,156

[22] Filed: Dec. 31, 1990

[51] Int. Cl.⁵ .............................................. G01D 15/06

[52] U.S. Cl. .................................... 346/157; 355/220; 355/245; 346/155; 346/160

[58] Field of Search ........................ 346/157, 160, 155; 355/220, 245, 259, 253, 274, 251, 250; 118/656, 657, 658, 645

[56] References Cited

U.S. PATENT DOCUMENTS

| | | | |
|---|---|---|---|
| 3,766,850 | 10/1973 | Silverberg | 118/656 X |
| 3,811,766 | 5/1974 | Robinson, Jr. | 355/259 |
| 4,461,561 | 7/1984 | Plumadore | 355/219 |
| 4,600,291 | 7/1986 | Ohtsuka et al. | 355/256 |
| 4,624,554 | 11/1986 | Ohtsuka et al. | 355/64 |
| 4,897,677 | 1/1990 | Lai | 346/155 |
| 4,920,421 | 10/1988 | Stemmle . | |
| 5,006,868 | 4/1991 | Kinoshita | 346/157 |

*Primary Examiner*—Benjamin R. Fuller
*Assistant Examiner*—Randy W. Gibson
*Attorney, Agent, or Firm*—Warren W. Kurz

[57] ABSTRACT

Color printer combining two small, reciprocating scanning process modules on respective photoconductor drums in two adjacent print engines. The two print engines are operable in a parallel electrophotographic processing scheme wherein charging, exposure, and development of two color images are achieved on the respective photoconductive drum. Accordingly, a composite four-color image is printed by superimposed transfer of first and second two-color developed toner images onto a receiver.

26 Claims, 5 Drawing Sheets

ELECTROPHOTOGRAPHIC WITH SCANNING PROCESS MODULE

FIELD OF THE INVENTION

This invention relates generally to electrostatographic printers, and more specifically to a simplified parallel process color printer.

BACKGROUND OF THE INVENTION

Multicolor printers using electrostatographic processes are known. However, most are large floor-standing units that are complex and quite expensive due to their feature-rich design. That is, they do not provide to the end user the benefits of what is colloquially known as a desktop or "personal" printer. Such a printer has been envisioned as a very small, lightweight unit that is reliable, inexpensive, compact, simple to operate, easy to equip with toner and other consumables, and which produces little waste.

Accordingly, there is a need for a small, inexpensive four-color printer that is nonetheless capable of producing several good quality color copies per minute. End users of such a printer would benefit from a desktop sized, easy-to-use printer that reliably produces quality color copies at a low cost.

SUMMARY OF THE INVENTION

Simplicity, compactness, and low manufacturing cost are achieved in a parallel process electrostatographic color printer by combining two small, reciprocating scanning process modules on respective photoconductor drums in two adjacent print engines. The two print engines are operable in a parallel electrostatographic processing scheme wherein charging, exposure, and development of two color images are achieved on each photoconductor drum. Accordingly, a composite four-color image is printed by superimposed transfer of first and second two-color developed toner images onto a receiver.

The contemplated printer affords several advantages. Compactness is achieved through the use of two photoconductive drums instead of the four nominally used in the four-color printing schemes of the prior art. The two process modules are of a size substantially smaller than the conventional process cartridges used in existing printers. Ease of operation is achieved through the use of simple toner bottles which are self-opening and whose toner level can be visually observed by the user. The printer may be manufactured at low cost, and offers high reliability, because the number and size of parts required to perform the four-color electrophotographic process is greatly reduced.

BRIEF DESCRIPTION OF THE DRAWINGS

In the detailed description of the preferred embodiment of the invention, reference is made to the accompanying drawings, in which.

Figure 1:
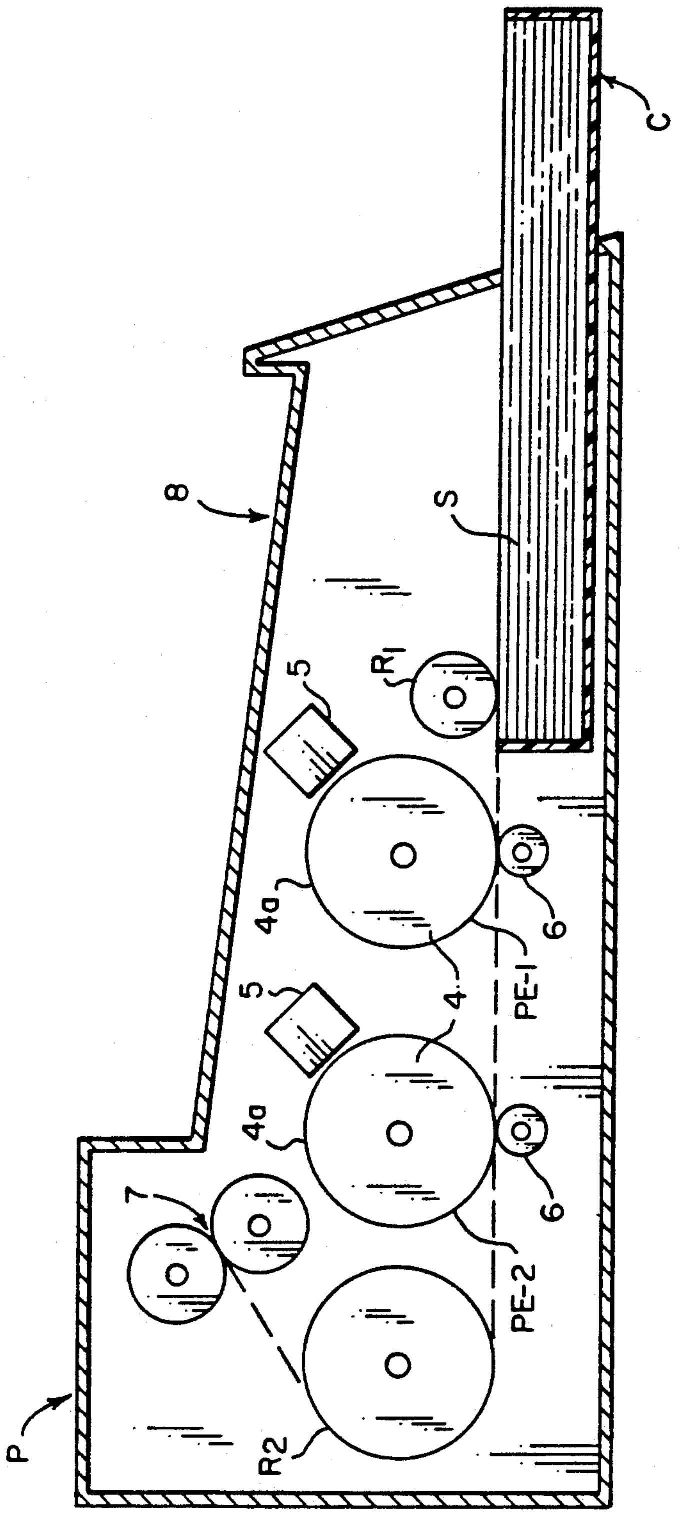
FIG. 1 is a schematic view illustrating two-roller, four color parallel process printer constructed according to the present invention.
Figure 3:
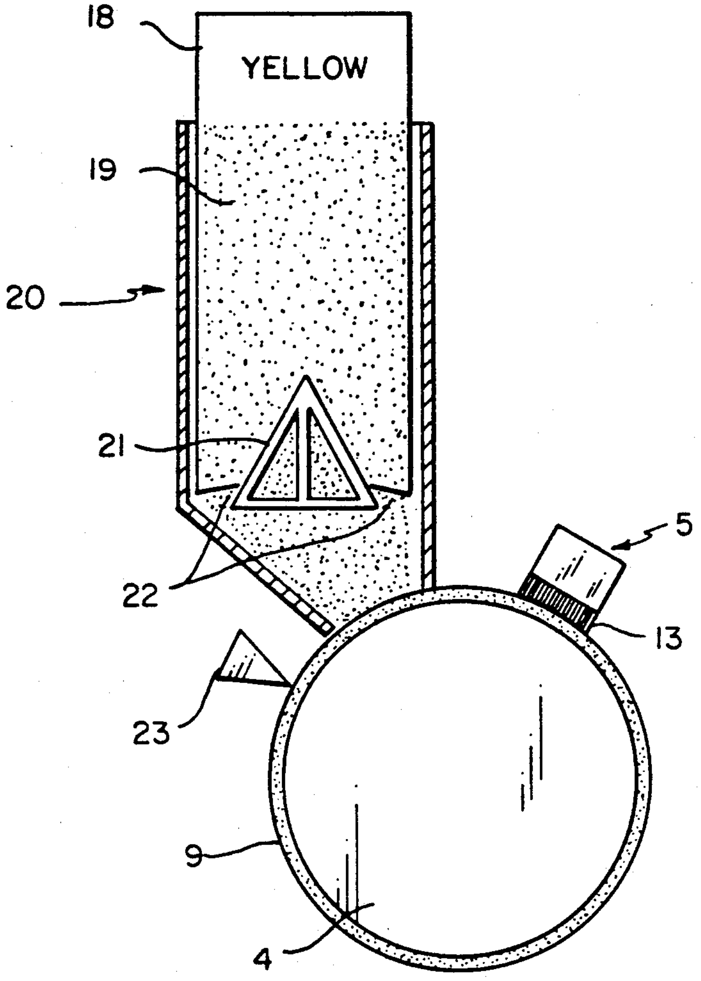
Figure 4:
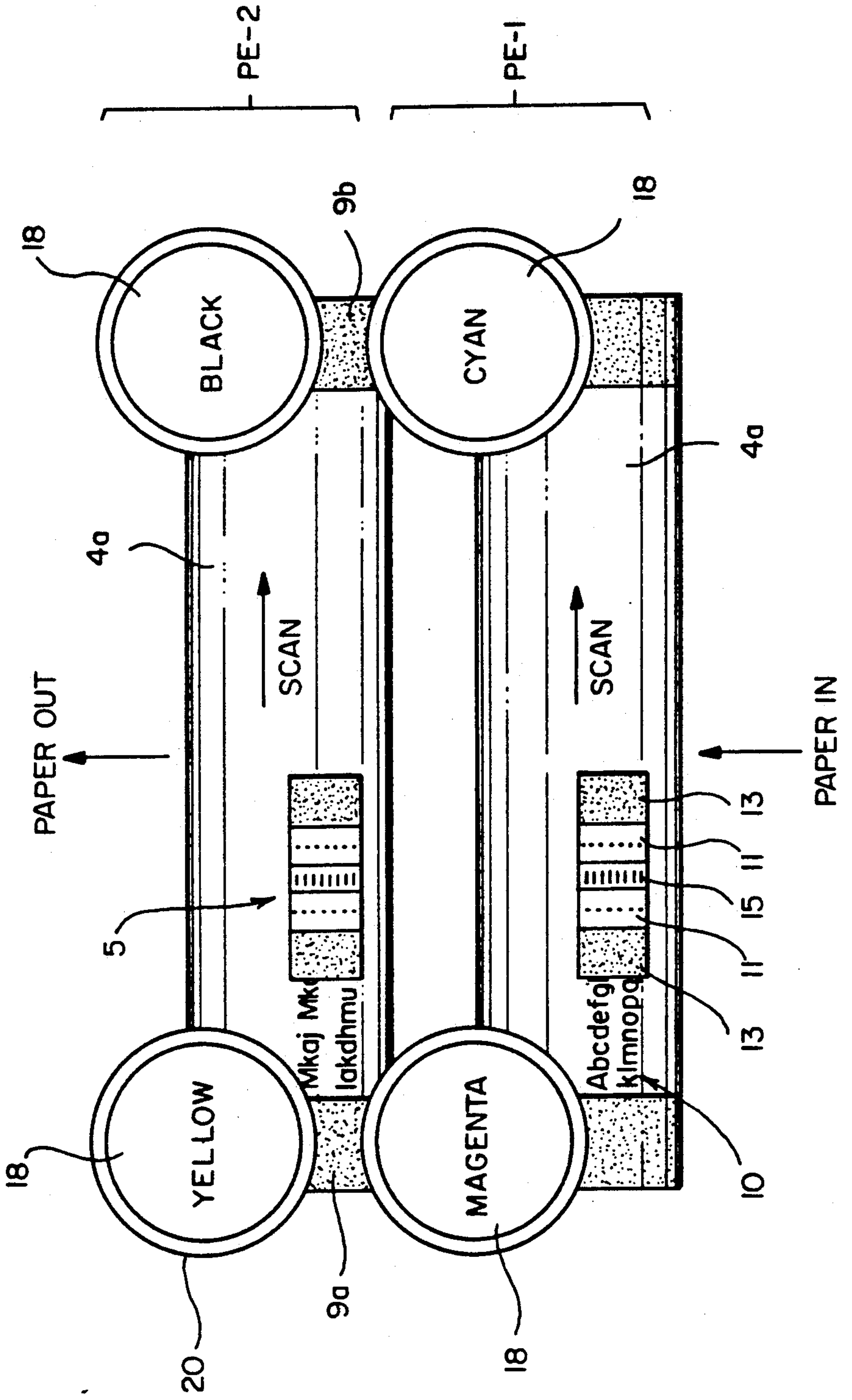

FIG. *2a* is a schematic perspective view of the photoconductor drum and process module of the printer shown in FIG. 1, with the toner replenishment means omitted for clarity;

FIG. *2b* is an enlarged schematic perspective view of the process module of FIG. *2a*;

FIG. 3 is a schematic side view of the toner replenishment mechanism of the printer shown in FIG. 1;

FIG. 4 is a schematic plan view of the two print engines of the printer of FIG. 1; and FIGS. *5a* through *5d* are a front elevational views of a portion of one of the print engines of FIG. 4, showing successive stages of its operation.

In the drawings and specification to follow it is to be understood that like numeric designations refer to components of like function.

DESCRIPTION OF THE PREFERRED EMBODIMENT

The apparatus of the preferred embodiment will be described in accordance with an electrophotographic image recording process. Because electrophotographic reproduction apparatus are well known, the present description will be directed in particular to elements forming part of, or cooperating more directly with, the present invention. Apparatus not specifically shown or described herein are selectable from those known in the prior art. For example, the preferred embodiment is disclosed as a drum-based printing apparatus for producing hard copy prints on a paper receiver, but other web-based and planographic printing schemes may be used in carrying out the invention. The invention is also not limited to a method and apparatus for creating images on a paper receiver, as other receiver media such as metallized or plastic film may also be used to advantage within the spirit of the invention.

With reference now to FIG. 1, there is shown a compact, electrophotographic color image reproduction apparatus according to the present invention. The contemplated color printer P includes several work stations shown along a path taken by a receiver sheet S. These stations will first be briefly described.

The printer P includes two substantially similar print engines PE-1 and PE-2, each of which comprise a rotatable drum 4, a movable process module 5, and a transfer station 6. The drum 4 has thereon a recording medium such as a photoconductive surface 4*a* or other photosensitive media that is rotatably exposed to the process module 5 by rotation of the drum by a driving means (not shown) in a conventional manner. Timed rotation of the drum 4 and movement of the process module 5 is controlled by logic and control unit circuitry as is known in the art. Rollers R1 and R2, transfer station 6, and fusing station 7 are also activated and operated by motor drives and associated control circuitry as is known in the art.

The drum 4 is driven in clockwise direction causing successive image frames on the photoconductive surface 4*a* to sequentially pass under the process module 5 and then to the transfer station 6. In synchronization with the drum movement, copy paper receiver sheets S stored in a cassette C are fed one sheet at a time by roller R1 into engagement with the first, then the second, of the two print engines.

The photoconductive surface 4*a* of each drum 4 is adapted to receive an electrostatic charge which is imagewise exposed and developed by one of the two identical process modules 5. Each two-color developed image is thereby transferred to the receiver sheet at a transfer station 6. Having gained a composite four-color toner image, the receiver sheet S is guided through fusing station 7, where the composite image is fixed before the finished hard copy exits into receiving tray 8. The fusing station may comprise two parallel heated pressure rollers between which the sheet S is passed to fix the toner image to the sheet.

Figure 2B:
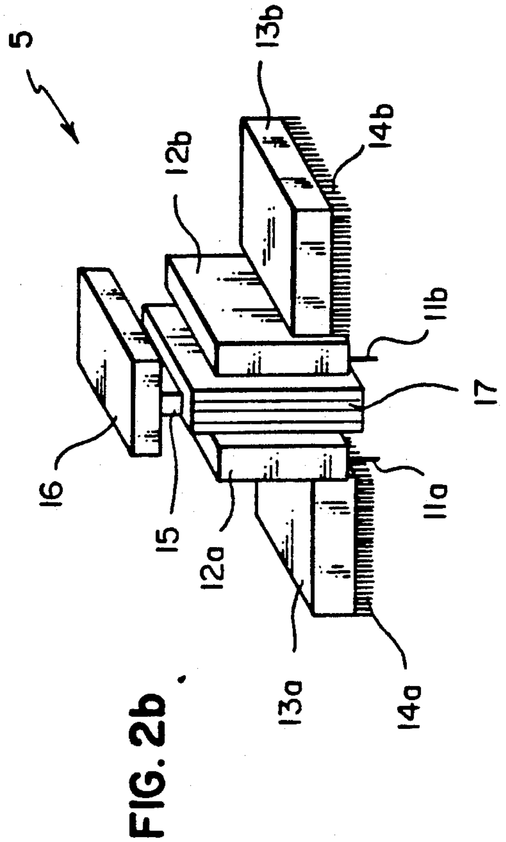
Figure 2A:
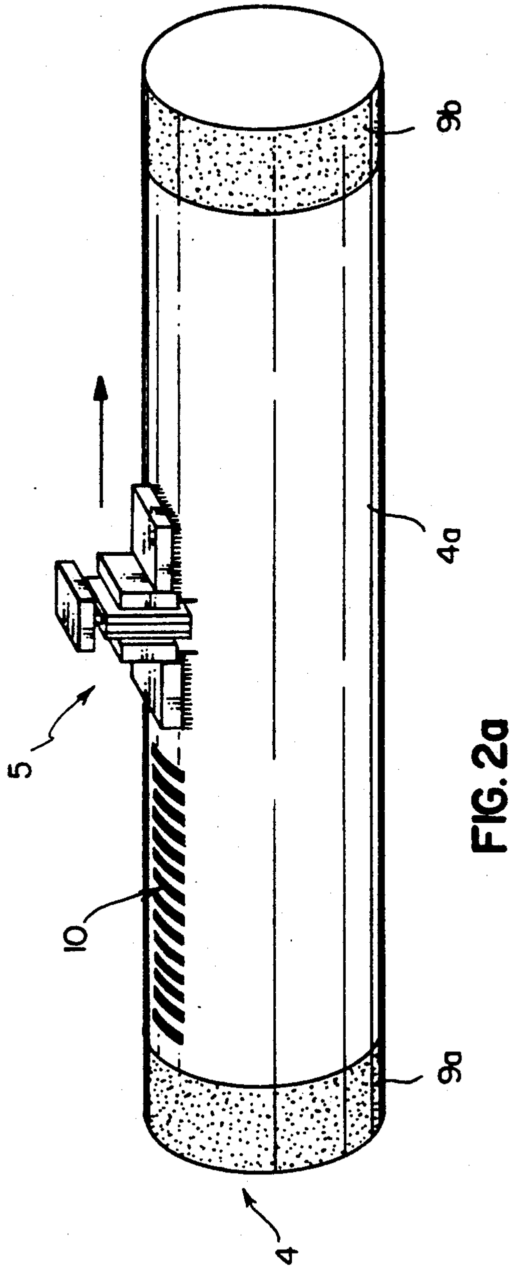

With reference now to FIGS. 2*a* and 2*b*, one of the two print engines will be described. As the print engines are substantially identical, the following description applies to both print engines, with the exception of the particular color of toner used in either print engine.

Process module 5 consists of a multiple light emitting diode (LED) array 15, mounted on a substrate 16 which contains interconnections to each LED and LED drive circuitry. The LED array is supplied with image information signals by appropriate circuitry as is known in the art. A lens array 17 is used to project the pixel image created by the LED array 15 onto the photoconductive surface 4*a*. Two electrostatic chargers 11*a* and 11*b* are mounted next to the lens array 17. Symmetrically displaced from the chargers are two toning shoes 14*a* and 14*b*.

All of the foregoing components are fixed in the process module 5 so as to move as a unit, although the toning shoes 14*a* and 14*b* are also individually movable in the vertical direction while attached to the process module. For example, toning shoe 14*a* is shown in its active (down) position, while toning shoe 14*b* is in its retracted (up) position. The function and operation of each process module is intended to accurately provide a stripwise portion 10 of a toned image that is created on the photoconductive surface 4*a* of the drum 4, as will be described below with respect to FIGS. 5*a* through 5*d*. The process module is therefore operated in a linear motion along the axis of the drum 4. Means for effecting synchronized movement of the process module linearly above the drum 4 are known, such as a servo-controlled motorized carriage on a track (not shown for clarity).

As shown in FIGS. 3 and 4, a total of four toner replenishment mechanisms are provided such that one of each mechanism is located above each end of the two drums 4. Toner is initially loaded in a replenishment mechanism by inverting and then inserting a toner-filled toner bottle 18 into a hopper 20. As the bottle 18 is pushed downward, a perforator 21 pierces a bottle membrane 22 on the mouth of the bottle, thus allowing the single component toner 19 to flow from the bottle 18 into hopper 20. By making one or more aligned portions of the bottle 18 and the hopper 20 transparent, a window is provided such that the toner supply level can be readily observed by the user.

Toner 19 from two of the hoppers 20 then is metered onto two respective toner donor rings 9*a* and 9*b* on the drum 4. Each toner donor ring is preferably a drum segment that is biased to attract toner by suitable means (not shown) and therefore is electrically insulated from the remainder of the drum 4. The donor rings 9*a* and 9*b* are preferably integral with the photoconductive drum so as to be rotatable as a unit; however, it is contemplated that the drum 4 and toner donor rings 9*a* and 9*b* may instead comprise separately rotatable units.

Each toner donor ring 9*a* and 9*b* includes toner-retaining means, such as a nap of short, dense fiber bristles, that is capable of performing as a holding station for the toner 19 metered thereon from the respective toner hopper 20. As each toner donor ring 9*a* and 9*b* is rotated incrementally below respective hoppers 20, its surface is maintained with a predetermined amount of toner. This toner replenishment mechanism is identical for the four differing colors of toner, which, as an example, are illustrated as being magenta, cyan, yellow, and black toner in FIG. 4.

Figure 5A:
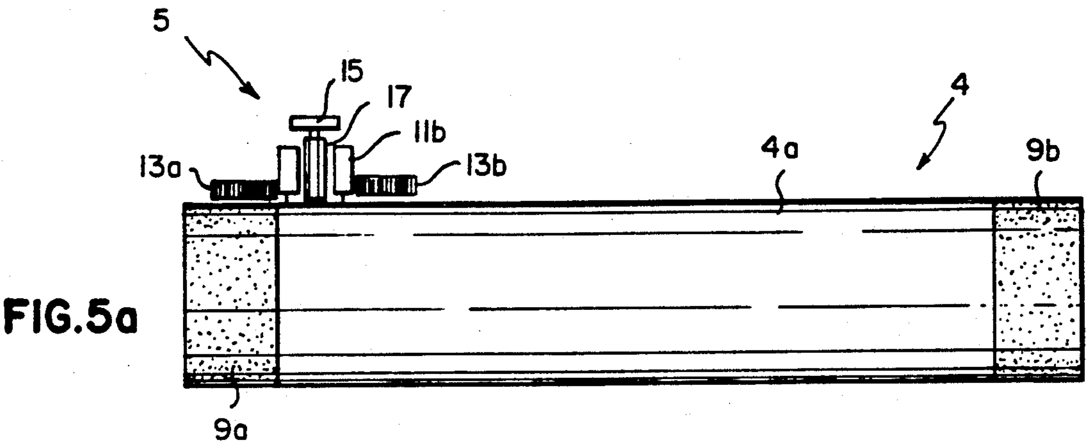

Referring now to FIGS. 5*a* through 5*d* in succession, the printing scheme for each of the print engines will be understood. In FIG. 5*a*, the process module 5 is first located over the toning ring 9*a* in what may be termed an initial toner loading position. Toning shoe 13*a* is lowered by known means (not shown) to the active position such that its' underside may accumulate an amount of toner sufficient to develop one stripwise portion of an electrostatic image (not yet formed) on the photoconductive surface. The underside of the toning shoe 13*a* preferably comprises a fiber nap that is electrostatically biased to attract toner of a first color (e.g., magenta) from the respectively-loaded toner donor ring 9*a*.

Figure 5B:
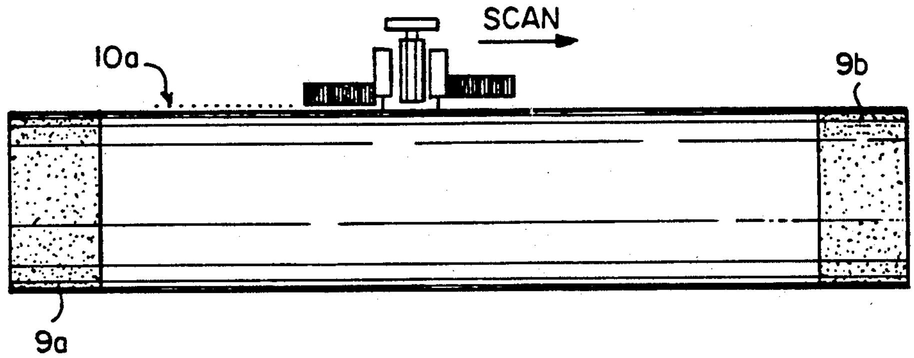

Next, the process module 5 is moved linearly on-axis along the stationary drum 4 as shown in FIG. 5*b*. As it does so, charger 11*b* is activated with a predetermined bias voltage to deposit a uniform electrostatic charge on the stripwise portion 10 of the photoconductive surface 4*a* over which it travels. The stripwise portion of the photoconductive surface is thereby sensitized by the received uniform electrostatic primary charge. The output of the charger may be controlled by a grid connected to a programmable power supply (not shown). The supply is in turn controlled by logic and control circuitry to adjust the voltage level $V_o$ on the photoconductive surface.

Soon thereafter, and with continued movement of the process module, the LED array 15 is activated with image data signals such that light from the LED array passes through the lens array 17 to expose the charged portion of the photoconductive surface 4*a* in an image-wise fashion. The exposure thus establishes a stripwise portion of a latent electrostatic image in a polarity attractive to the toner residing on the toning shoe 13*a*. The electrostatic image is formed by the incident light which modulates the primary charge on the drum surface in accordance with signals provided by an image data source such as a raster image processor (RIP) in a document image scanner, computer work station, word processor, or the like.

With still continued movement of the process module, the toning shoe 13*a* develops the charge differential established in the latent image with the toner 10*a* carried from the donor ring 9*a*. The toner preferably consists of pigmented particles having an electrostatic charge opposite to that of the latent electrostatic image. The toner particles adhere to the latent electrostatic image to form a visible, transferable image. The latent image is thereby developed on the photoconductive surface 4*a* quite soon the latent image is created. Alternatively, the toner particles may have a charge of the same polarity as that of the latent electrostatic image and the latent image is developed in accordance with known reversal development techniques.

Figure 5C:
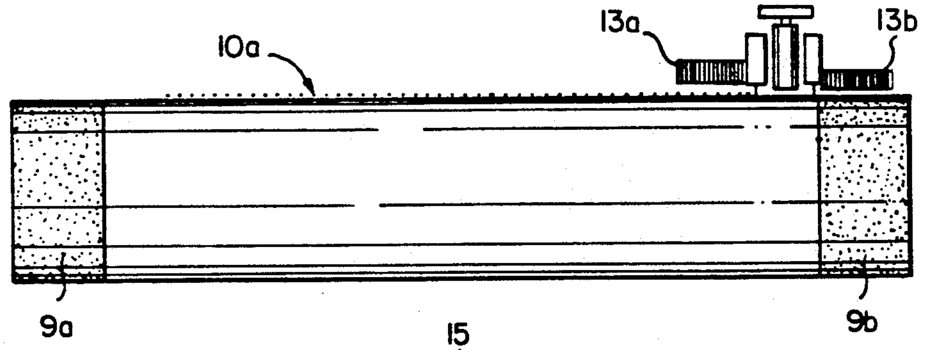

The process module 5 continues to incrementally charge, expose, and develop the stripwise portion 10 of the photoconductor drum (in a movement termed hereinafter as a scan) according to the image information until it reaches the opposite end of the photoconductor drum. The process module stops and is thereupon automatically in a position to be replenished with toner resident on the toning ring 9*b*, as shown in FIG. 5*c*. Toning shoe 13*a* is retracted to its inactive position and toning shoe 13*b* is lowered. The underside of toning shoe 13*b* preferably comprises a fiber nap that is electrostatically biased to attract the toner (which is of a second color, e.g. cyan) from the doner ring 9*b*.

Figure 5D:
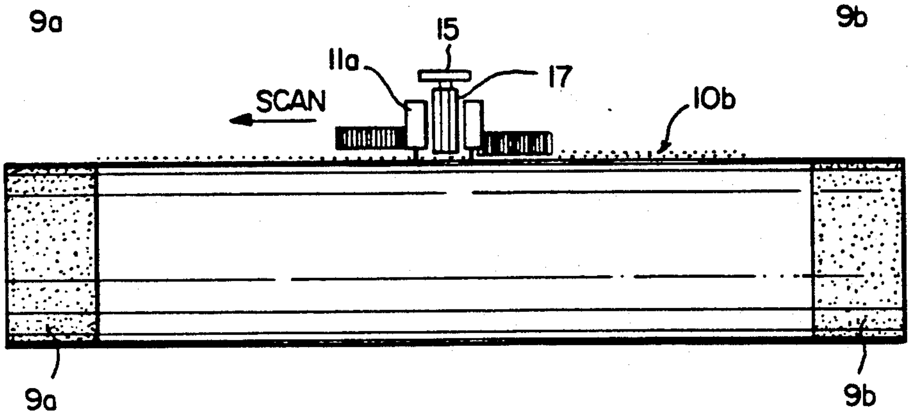

As shown in FIG. 5*d*, process module 5 is then moved leftwise in a reverse motion to scan across the still-stationary photoconductor drum. The result is an imagewise charge, exposure, and development of the same stripwise portion 10 of the drum covered in FIGS. 5*a* and 5*b* using charger 11*a*, LED array 15, and toning shoe 13*b*. The second image thereby created is thus preferably comprised of the second color toner 10*b* in a pattern according to the image information supplied to the process module 5 during the second scan. Having reached the "load" position at the end of the second scan, the drum 4 is incrementally rotated to the next scan line position and the first and second scan sequence repeats, as shown and already described with respect to FIGS. 5*a*–5*d*.

With repeated incremental drum rotation and synchronized scanning by the process module 5, a complete image frame is thus formed on the photoconductive surface of the drum 4. Concurrently, the earlier-created portions of the image are transferred to the receiver sheet S, as the drum section that contains such portions reaches the transfer station 6 as shown in FIG. 1. Residual toner remaining on the photoconductive drum 4 after transfer is removed using a conventional cleaning apparatus such as a cleaning blade 23, shown only in FIG. 3 for clarity.

Because a second print engine PE-2 is mounted in the receiver paper path adjacent to the first print engine PE-1, the contemplated printer P is preferably operated in a "parallel process" mode to provide two-color component images on each of the two drums 4 (cf. FIGS. 1 and 4). Thus, two of the four-color component images of a particular multicolor image may be processed and transferred to a receiver at the first print engine, and the remaining two component images may be superimposed "in-line" at the second print engine. In practice, concurrent operation of the two print engines is preferred wherein each print engine would be processing two color components of two different multicolor images at any one time. It is contemplated that additional, substantially identical print engines may be included in-line for parallel processing of six-color images, etc. according to the foregoing scheme.

The apparatus and method disclosed herein permits the construction of an image reproduction or printing apparatus that provides a reproduction of a four-color image with great simplicity and at low cost. The image formation method and apparatus as taught according to the present invention is directed not only to the illustrated drum-based apparatus but to any similar reproduction apparatus in which the surface of a moving media, such as a photoconductive web, is incrementally rotated and scanned by the process modules as taught herein.

Elements of the forgoing components may be selected from the known art according to the teachings herein. For example, the lens array 17 may be a SELFOC gradient index lens array of cylindrical lenses, each of which have a parabolic refractive index distribution. Such an array is available from NSG American, Inc., a subsidiary of Nippon Sheet Glass Co., Ltd., Tokyo, Japan. Techniques are also known for operation of printhead apparatus which comprise a multiplicity of individually addressable and energizable point-like radiation sources, such as LED's, for exposing points upon a photoconductive surface. Driver circuits are similarly known for energizing the radiation sources in response to respective data signals applied to the driver circuits.

Logic and control circuitry is known for sequentially actuating, then de-actuating the work stations as well as for controlling the operation of other printer functions. Encoding means, for example, may also be provided on the drums 4 as known in the art for providing precise timing signals for control of the aforementioned printing steps.

It is emphasized that numerous changes may be made in the above-described apparatus and method without departing from the teachings of the invention. It is intended that all of the matter contained in the foregoing description, or shown in the accompanying drawings, shall be interpreted as illustrative rather than limiting.

What is claimed is:

1. An electrostatographic print engine responsive to image information for producing a corresponding hard copy image reproduction, comprising:

an endless support driven along an endless path about an axis, said support having a first segment for reserving a predetermined quantity of colored marking particles and a second adjacent segment axially disposed with respect to said first segment and having a photoreceptive surface;

a process module movable between the first segment and the second segment for producing transferable developed images on said photoreceptive surface, said process module comprising:

(a) charging means for uniformly establishing an electrostatic charge on the photoreceptive surface, (b) exposure means for imagewise exposure of the photoreceptive surface to provide a latent electrostatic image, (c) development means including means for picking up a portion of the reserved colored marking particles from the first segment and for applying such particles to the electrostatic latent image to form a developed image; and transfer means for transferring the developed image to a receiver.

2. The print engine of claim 1, wherein the support is a rotatable drum.

3. The print engine of claim 2, wherein the first segment further comprises a fiber nap suitable for receiving and discharging the marking particles.

4. The print engine of claim 1, further comprising means for cleaning untransferred marking particles from the photosensitive surface.

5. The print engine of claim 1, wherein the exposure means further comprises:

printhead apparatus having a multiplicity of individually addressable and energizable point-like radiation sources and a lens array adjacent the multiplicity of radiation sources for transmission of their output to the photoreceptive surface; and drive means for energizing the radiation sources in response to the image information.

6. The print engine of claim 5, wherein the multiplicity of radiation sources is a light-emitting diode (LED) array.

7. The print engine of claim 1, further comprising means for activating and deactivating the development means with respect to the first and second segments.

8. The print engine of claim 7, wherein the development means further comprises a toning shoe having a surface movable with respect to the photoconductive surface and having a fiber nap on the surface suitable for acquisition, transport, and discharge of the marking particles.

9. The print engine of claim 1, further comprising means for marking particle replenishment located adjacent the first segment, such means comprising:

a hopper adapted to receive a container having a supply of marking particles therein;

an opening device for opening the container to admit marking particles from the container into the hopper; and means for metering the admitted marking particles onto the first segment.

10. The print engine of claim 9, wherein the hopper includes an opening for receiving the particle container inserted therethrough, and wherein the opening device is located on the replenishment means for engaging and opening the container as the container is at least partially inserted into the hopper.

11. The print engine of claim 9, wherein the hopper includes an opening for viewing toner level in at least one of the hopper and the container.

12. A multicolor electrostatographic print engine responsive to color image information for producing a corresponding color image on a receiver, comprising:

an endless photoconductive recording element driven along an endless path about an axis, said recording element having an axially spaced first segment and an adjacent second segment for reserving first and second marking particles of different color, respectively, and a third segment having a photoreceptive surface located between said first segment and said second segment;

a process module movable between the first segment and the second segment and across the photoreceptive surface for producing transferable multicolor images on said photosensitive surface, said process module comprising:

(a) charging means for producing a uniform electrostatic charge on the photoreceptive surface, (b) exposure means for imagewise exposing the uniformly charged photoreceptive surface to provide a first latent electrostatic image during movement of the process module from said first segment toward said second segment, and a second electrostatic image during movement of said process module from said second segment toward said first segment, (c) first development means having means for picking up a portion of the first reserved colored marking particles from the first segment and for applying such marking particles to the first electrostatic latent image to form a first developed image; and (d) second development means having means for picking up a portion of the second reserved colored marking particles from the second segment and for applying such particles to the second electrostatic latent image to form a second developed image; and transfer means for transferring the first developed image and the second developed image to a receiver.

13. The print engine of claim 12, wherein the support is a rotatable drum.

14. The print engine of claim 12, further comprising means for cleaning untransferred marking particles from the photosensitive surface.

15. The print engine of claim 12, wherein the exposure means further comprises:

printhead apparatus having a multiplicity of individually addressable and energizable point-like radiation sources and a lens array adjacent the multiplicity of radiation sources for transmission of their output to the photoreceptive surface; and drive means for energizing the radiation sources in response to the image information.

16. The print engine of claim 15, wherein the multiplicity of radiation sources is a light emitting diode (LED) array.

17. The print engine of claim 12, wherein the process module is linearly moveable in a first path with respect to the photoreceptive surface to provide the first developed image, and in a second coincident path to provide the second developed image superimposed on the first developed image.

18. The print engine of claim 17, further comprising means for activating and deactivating the development of the first and second latent electrostatic images.

19. The print engine of claim 18, wherein each of the first and second development means further comprises a toning shoe having a surface movable with respect to the photoconductive surface and a fiber nap on the surface suitable for acquisition, transport, and discharge of the marking particles.

20. The print engine of claim 12, wherein the first segment and the second segment further comprise a fiber nap suitable for receiving and discharging the marking particles.

21. The print engine of claim 12, wherein the first segment, the second segment and the third segment are independently rotatable.

22. The print engine of claim 12, further comprising first and second means for replenishment of the marking particles in the first segment and the second segment, respectively, the first and second means being respectively located adjacent the first segment and the second segment and each of such replenishment means comprising:

a hopper adapted to receive a container having a supply of marking particles therein;

an opening device for opening the container to admit particles from the container into the hopper; and means for metering the admitted marking particles onto the respective one of the first segment or the second segment.

23. The print engine of claim 22, wherein the hopper includes an opening for receiving the particle container inserted therethrough, and wherein the opening device is located on the replenishment means for engaging and opening the container as the container is at least partially inserted into the hopper.

24. The print engine of claim 22, wherein the hopper includes an opening for viewing toner level in at least one of the hopper and the particle container.

25. A multicolor electrostatographic printer responsive to color image information for producing a corresponding color image, said printer comprising:

a pair of endless recording elements, each being driven along an endless path about an axis and having a first segment and a second adjacent axially spaced segment for reserving predetermined quantities of different colored marking particles and a third segment having a photoreceptive surface located between the first segment and the second segment;

a pair of process modules, one associated with each of said recording elements and movable between the first segment and the second segment of said recording elements across the respective photoreceptive surface thereof, for producing transferable for two-color images on each of said recording elements, each of said process modules comprising:

(a) charging means for establishing a uniform electrostatic charge on the photoreceptive surface, (b) exposing means for imagewise exposing a uniformly charged photoreceptive surface to produce an electrostatic image on said photoreceptive surface, (c) first development means having means for transporting a portion of the reserved colored marking particles from the first segment and for applying such marking particles to a first electrostatic latent image formed on the photoreceptive surface to form a first developed image thereon; and (d) second development means having means for transporting a portion of the reserved colored marking particles from the second segment and for applying such particles to a second electrostatic latent image formed on the photoreceptive surface to form a second developed image thereon, each of the process modules being linearly moveable along a first path with respect to an associated recording element to provide the first developed image and along a second coincident and opposite path to provide the second developed image superimposed on the first developed image;

transfer means for transferring the first developed image and the second developed image from each of said recording elements to a receiver; and means for fixing the first transferred image and the second transferred image to the receiver.

26. A multicolor electrostatographic print engine responsive to color image information for producing a corresponding color image on a receiver comprising:

an endless photoconductive recording element driven along an endless path about an axis, said recording element having an axially spaced first segment and an axially spaced adjacent second segment for reserving first and second marking particles of different color, respectively, and a third segment having a photoreceptive surface located between said first segment and said second segment;

a process module movable between the first segment and the second segment and across the photoreceptive surface for producing transferable multicolor images on said photosensitive surface, said process module comprising:

(a) first and second charging means for establishing first and second uniform electrostatic charges on the photoreceptive surface, (b) exposure means for imagewise exposing a uniformly charged photoreceptive surface to provide a first latent electrostatic image thereon during movement of the process module from said first segment toward said second segment, and a second electrostatic image during movement of said process module from said second segment toward said first segment, said exposure means being located between said first and second charging means, (c) first development means having means for picking up a portion of the first reserved colored marking particles from the first segment and for applying such marking particles to the first electrostatic latent image to form a first developed image; and (d) second development means having means for picking up a portion of the second reserved colored marking particles from the second segment and for applying such particles to the second electrostatic latent image to form a second developed image, said first development means and said second development means being respectively located outwardly from the first and second charging means; and transfer means for transferring the first developed image and second developed image to a receiver.

* * * * *